April 19, 1938. A. F. PIEPER Re. 20,704

DENTAL SYRINGE

Original Filed May 8, 1936 2 Sheets-Sheet 1

INVENTOR.
Alphonse F. Pieper
BY Crumpton & Shepard
his ATTORNEYS

April 19, 1938. A. F. PIEPER Re. 20,704

DENTAL SYRINGE

Original Filed May 8, 1936 2 Sheets-Sheet 2

INVENTOR.
Alphonse F. Pieper
BY Cumpston & Shepard
his ATTORNEY.

Reissued Apr. 19, 1938

Re. 20,704

UNITED STATES PATENT OFFICE 20,704

DENTAL SYRINGE

Alphonse F. Pieper, Brighton, N. Y.

Original No. 2,085,470, dated June 29, 1937, Serial No. 78,603, May 8, 1936. Application for reissue October 13, 1937, Serial No. 168,834

28 Claims. (Cl. 219—39)

The present invention relates to a fluid control device such, for example, as a dental syringe, and has for its object to provide in a device of this class a simplified construction embodying relatively few parts which can be conveniently assembled and operated.

A further object of the invention is to provide an improved arrangement of parts within the body of the syringe for effectively heating and controlling the fluid or liquid therein.

A further object of the invention is to provide improved means for heating an initial supply of liquid within the syringe on either or both sides of the valve for controlling the liquid outlet, whereby to provide for the instant flow of preheated liquid from the nozzle at the desired temperature upon opening the valve.

A further object of the invention is to provide in a syringe of this class a plurality of unitary detachably associated fluid heating and control sections which can be readily assembled or detached one from another, and which will be dependable and efficient in service.

A further object of the invention is to provide in combination with a dental syringe having a conduit connected with a liquid supply unit for supplying warm or cold liquid to the syringe, improved heating means within the syringe for maintaining the liquid therein at a predetermined temperature ready for use upon opening the valve for controlling the flow of the liquid.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

Figure 1:
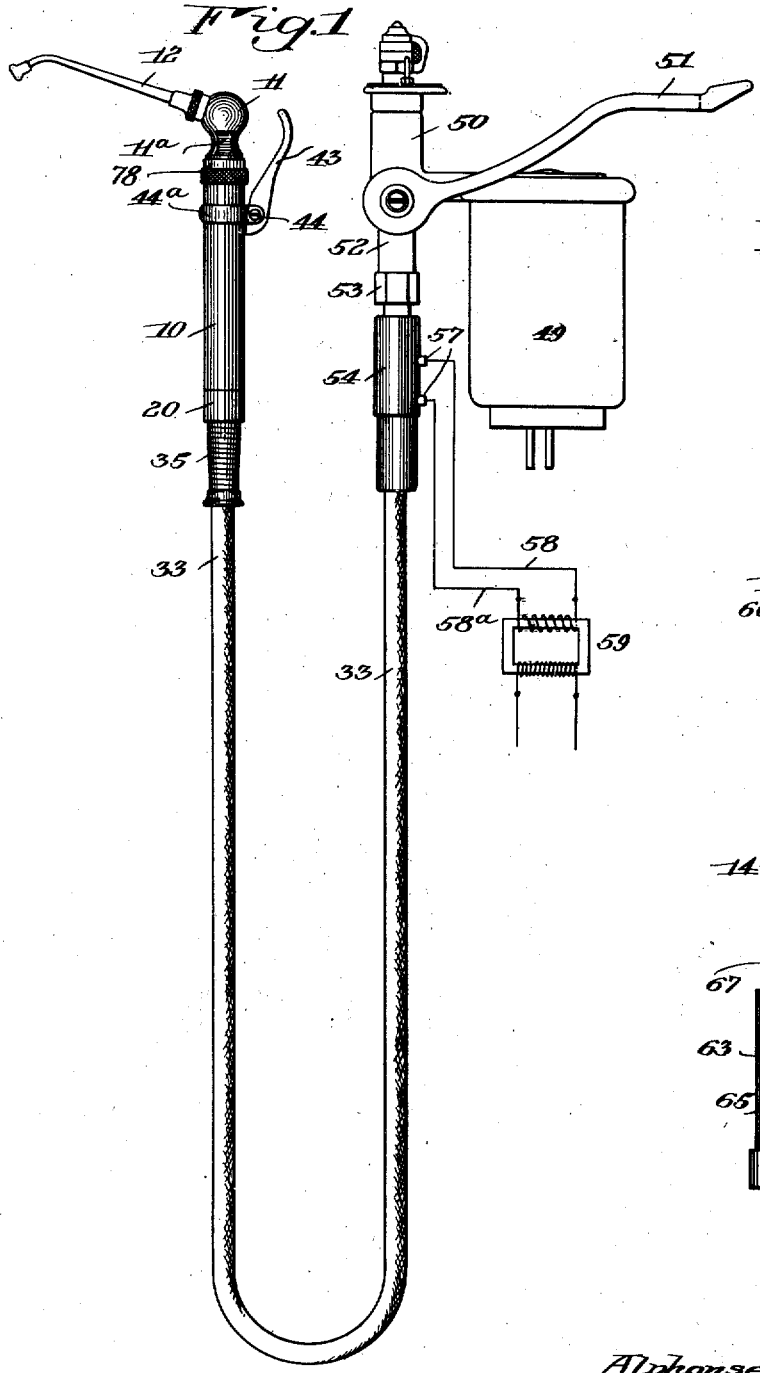
Fig. 1 is a view in elevation of a fluid temperature control device embodying the invention.

Referring to the drawings, the syring comprises a pair of inner and outer tubular body sections 10 and 11 respectively, telescoped for movement one longitudinally of the other, the outer section having a nozzle 12 thereon in communication therewith. The inner section 10 constitutes the handle of the syringe to be gripped by the operator when using the syringe. A tubular section 13 is detachably mounted within the handle or body section 10 and has at its inner end an enlarged portion 13*a* closely fitting the bore of the handle, the enlarged portion having a reduced extension 14 carrying a reduced portion 15. Rigidly secured within the outer end of the reduced portion 15 is a tubular extension 16 telescoped within the bore 17 of the outer body section 11.

Figure 2:
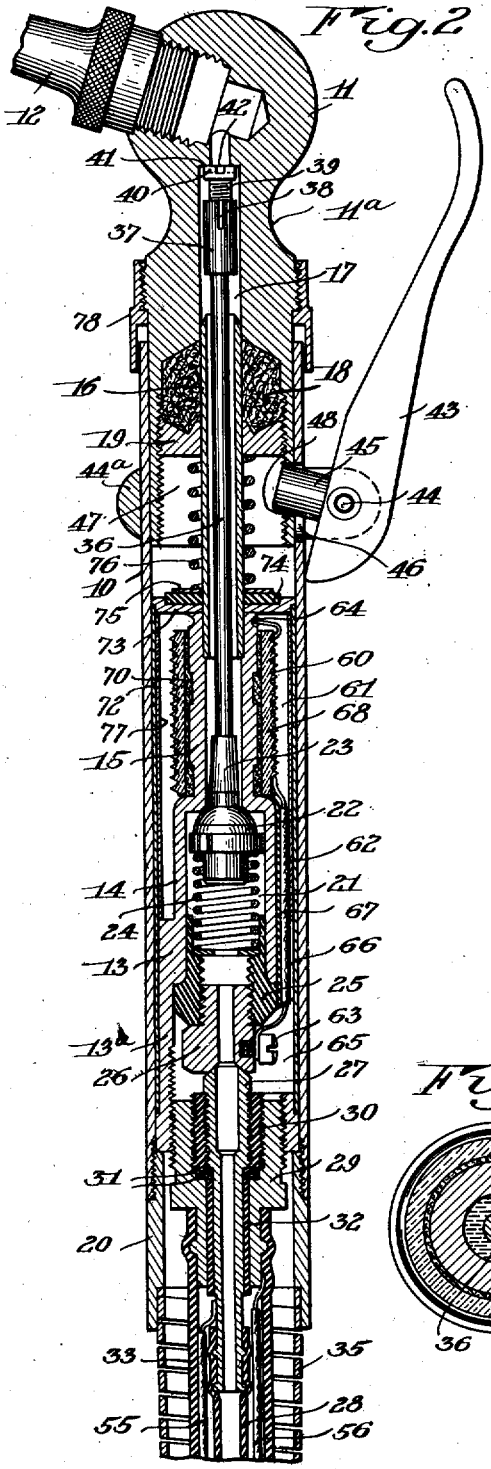
Fig. 2 is a longitudinal section through the syringe shown in Fig. 1.

A liquid-tight joint is formed between the tube 16 and the body section 11 by means of suitable packing 18 which is compressed and held in position by a nut 19 threaded within the body section, as shown in Fig. 2.

Figure 3:
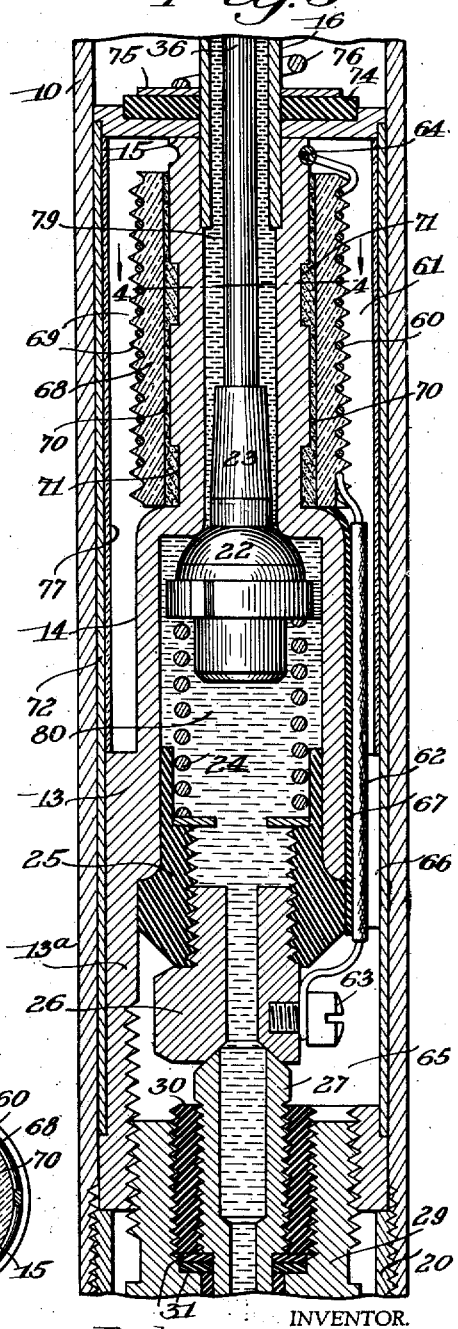
Fig. 3 is a fragmentary longitudinal section through the body of the syringe drawn to an enlarged scale and showing the arrangement of the fluid control valve and heating coil.
Figure 4:
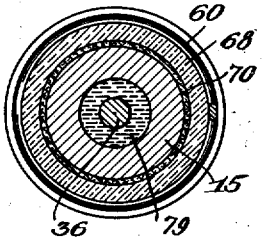
Fig. 4 is a horizontal section on line 4—4 of Fig. 3.

The tubular section 13 is detachably supported within the handle or inner body section 10 by means of a thimble 20 threaded within the body section and shouldered at its outer end to receive the tubular section 13. The reduced portion 14 of the inner tubular section forms a valve chamber 21 within which is mounted a suitable valve 22 having a gradually tapered portion 23 extending within the bore of the reduced portion 15 of the tubular section 13, as shown in Figs. 2 and 3. The valve is normally held in closed position by a spring 24 within the chamber 21, the spring being carried by a tubular support 25 formed of suitable insulating material and closely fitted within the enlarged portion 13*a* of the tubular section 13. Screwed into the support is a metal contact 26 having its lower end recessed to receive the beveled end of a coupling 27, suitably connected with a flexible tube 28 for supplying liquid to the valve chamber 21, the tube being connected with a suitable source of liquid as described hereinafter.

The coupling 27 is extended through an outer coupling 29 which is threadedly secured within the lower end of the enlarged portion 13*a* of the tubular section 13 as shown in Figs. 2 and 3. The coupling 27 is supported within the outer coupling 29 by a connection 30 formed of insulating material which serves to clamp the gaskets 31 upon the inner wall of the outer coupling 29 to form a liquid-tight joint between the inner and outer couplings, as shown in Fig. 3. The inner coupling is further insulated from the outer coupling by means of a sleeve 32 formed of suitable insulating material.

The coupling 29 is reduced at its lower end to receive an outer flexible tube or conduit 33 containing the inner liquid supply tube 28 and the wires for supplying current to the heating coil, said tubes being connected with a suitable water supply unit, described hereinafter.

The outer conduit 33 is protected at its point of connection with the syringe by a guard 35 preferably comprising a coiled spring suitably connected with the thimble 20 for supporting the tubular section 13 within the handle or body section 10 of the syringe.

The tapered or conical portion 23 of the valve has loosely inserted therein an operating stem 36 which extends through the outer tube 16 of the tubular section 13 and into the bore or recess 17 of the outer body section 11, the latter having a fluid outlet passage communicating with the nozzle 12. The upper end of the valve stem has formed thereon an extension 37 slotted at 38 and threaded to receive a screw 39, the head 40 of which engages a seat 41 on the tubular section 11. By slotting the extension the opposite jaws thereof will yieldingly grip the screw to firmly hold it in adjusted position. The screw is slotted at 42 for the reception of a suitable tool for turning it to vary the length of the valve stem whereby to regulate the position of the valve to accommodate it to its seat. The slot 42 also serves as an outlet passage for the fluid admitted to the bore 17 of the tubular body member 11.

To effect opening of the valve it is only necessary to move the tubular body section 11 inwardly on the handle or body section 10, which is done by swinging the lever 43 toward the outer body section from the normal position shown in Fig. 2. The lever is pivotally supported at 44 on a band 45 substantially surrounding the body section 10 and suitably secured thereon. The lever has a laterally projecting part 45 extending through an opening 46 in the wall of the handle 10 and into a recess 47 formed in the outer body section 11. The projecting part 45 of the lever engages a shoulder 48 on the outer body section whereby when the lever is moved toward said section it will operate to move it longitudinally within the handle or body member 10 to effect opening of the valve.

The supply means from which fluid or liquid is discharged to the inner flexible tube 28 may be of any well known type, such, for example, as that shown by U. S. Patent No. 1,911,386, comprising a liquid control unit for supplying either hot or cold water to a dental syringe. A corresponding unit is indicated generally at 49 in Fig. 1 and comprises a reservoir having liquid inlet connections, not shown, and a communicating valve housing 50 having a discharge valve, not shown, provided with an operating arm 51 forked at its outer end to receive the reduced portion 11*a* of the tubular body section 11 of the syringe for supporting the syringe in a substantially vertical position when not in use, in which position the syringe serves to hold the valve in the housing 50 closed.

The housing has an extension 52 provided with a suitable connection 53 for supporting an insulating coupling 54 carrying the flexible tube 33, the fluid supply tube 28 therein and the circuit wires 55 and 56 disposed within the outer tube but exteriorly of the supply tube. The inner ends of the wires are shown in Fig. 2, but their outer ends, not shown, are suitably connected with the binding posts or studs 57 carried by the coupling 54. Secured to the binding posts are the circuit wires 58 and 58*a* which are connected with a step-down transformer 59, as shown in Fig. 1, the transformer being preferably connected with an ordinary lighting circuit, the voltage of the heating coil circuit being reduced to afford the desired heating capacity for the coil which is shown at 60 within the heating chamber 61 of the syringe.

As shown in Fig. 2 the circuit wire 55 is connected with the inner coupling member 27 and the circuit wire 56 with the outer coupling member 29, the coupling members being insulated one from another, as shown, and as previously described.

Extending from one end of the heating coil is a short connection 62 which in turn is connected with the metal contact 26 by a binding post 63. The opposite end of the coil is connected at 64 with the reduced portion 15 of the inner tubular section 13, with which is connected the coupling 29 and upon which is secured the inner end of the circuit wire 56, Fig. 2. Current for heating the coil will flow through wire 55, coupling 27, contact 26, and connection 62, returning through the tubular section 13 and the coupling 29 to wire 56.

Figure 5:
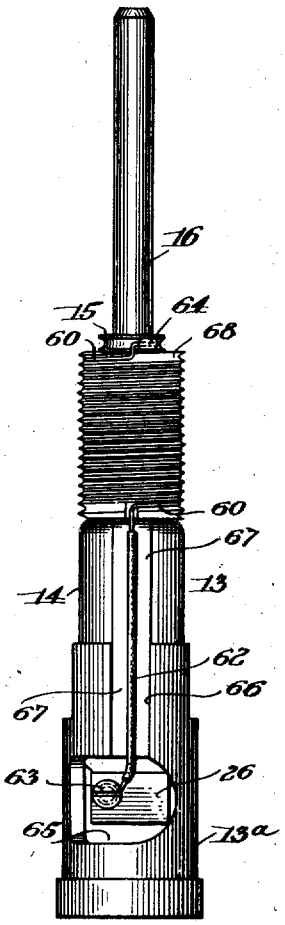
Fig. 5 is a side view of the unitary valve and heating coil section shown in Fig. 3, but drawn to a reduced scale.

The contact 26 is rendered accessible by providing an opening 65 in the wall of the tubular section 13 so that the screw or binding post 63 can readily be applied to secure the circuit connection 62 to said contact. The tubular section 13 is preferably slotted at 66 to receive a strip 67 of insulating material for holding the circuit connection 62 out of contact with the tubular section 13, as shown in Figs. 2, 3, and 5.

The heating coil 60 is wound upon a suitable support 68 formed of insulating material such, for example, as porcelain, the support being preferably grooved as indicated at 69 to hold the coils in proper spaced relation. The insulating support encircles the reduced portion 15 of the tubular section 13 and is preferably held thereon by the use of an inwardly disposed layer of cement or binding material 70. The portion 15 of the tubular section is grooved at 71 to form annular pockets for receiving portions of the binding material whereby to better secure the coil supporting member upon the inner tubular section.

The heating chamber 61 extends longitudinally of the tubular section 13, both inwardly and outwardly of the valve 22 and in surrounding relation with respect to the inner and outer fluid holding portions 14 and 15 of said section, so that the fluid or liquid therein will be maintained at the desired temperature by the heat given off by the coil 60. This applies also to the liquid within the extension 16 of the tubular section and that within the lower portion of the section 13, which portions will also be heated since they form a continuation of the portions 14 and 15 surrounded by the heating chamber 61.

The heating chamber is formed in part by a metal sleeve 72 inserted upon the tubular section 13 and closed at its outer end by a transverse wall 73 recessed to receive the outer end of the sleeve and suitably connected therewith. The wall 73 rests upon the outer end of the reduced portion 15 of the tubular section and is recessed to receive a gasket 74 for insuring a liquid-tight joint around the tubular extension 16. A metal disk 75 is placed upon the gasket to form a seat for the inner end of a spring 76 which surrounds the tube 16 and serves to yieldingly urge the inner end of the tubular section 13 against the end of the thimble 20, screwed into the handle or body 10 of the syringe, as shown in Fig. 2.

Means is provided for protecting the heating chamber 61 against undue loss of heat by radiation through the walls of the sleeve 72 and the handle or casing 10, this means preferably comprising a cylindrical element 77 inserted within the sleeve and formed of suitable insulating material such, for example, as mica.

A stop collar 78 is threadedly disposed on the body section 11 for adjustment thereon to limit inward movement of the section through engagement with the body or handle section 10 of the syringe whereby to regulate the extent of movement of the valve 22.

It will be understood that with the present syringe the fluid or liquid holding passage disposed outwardly of the valve 22 and formed by the portions 15 and 16 of the tubular section 13 will remain substantially filled with the liquid after the valve 22 has been closed. The liquid within said passage, indicated at 69 in Fig. 3, constitutes an initial supply which will be quickly discharged through the nozzle upon opening the valve. It is obviously desirable that this initial charge of liquid be maintained at the desired temperature and ready for instant use upon opening the valve and this is accomplished by placing the heating coil 60 of the chamber 61 in advance of the valve and in surrounding relation with respect to the passage or chamber containing the liquid, as shown in Figs. 2 and 3. It is also desirable that the liquid within the valve chamber 21, indicated at 80, be heated so as to increase the supply to be maintained at the desired temperature. To this end the heating chamber 61 is extended below the valve in surrounding relation with respect to the valve chamber and the liquid therein. With this arrangement the walls of the inner tubular section extending inwardly and outwardly of the valve will remain heated to maintain the liquid on opposite sides of the valve at the desired temperature and ready for instant use when needed.

As previously stated, the syringe is formed of a plurality of unitary sections which can be quickly assembled or detached one from another when desired. For example, before applying the thimble 20 to the handle 10, the inner tubular section 13 and associated parts may readily be inserted within the handle as a complete unit, which includes the tube 13 and its extension 16, the valve within the tube, the heating coil, and the casing surrounding the coil, these parts being likewise withdrawable from the handle as a unit.

The walls of the portion 15 of the tubular member 13 which are surrounded by the heating coil are made relatively thick to afford a substantial mass or body of metal, acting as a heat reservoir to store heat, and as a conductor for conducting heat from the heating element to the liquid within the portion 15 and also, to a lesser extent, to that within the portion 14. The heat stored in this mass of thick metal assists in rapidly heating up the incoming cooler liquid faster than would be the case if the heat reservoir were not provided. Thus a preheated supply of liquid at the desired temperature is maintained ready for instant use whenever required.

The conduit 33 and coupling 29 constitute another unit which may be attached to the section 13, either before or after assembling it within the handle. Furthermore, the conduit and tubular section and its associated parts may be inserted within or withdrawn from the handle as a unit. Moreover, the outer body section 11 and nozzle 12 constitute an additional unit detachably connected with the handle or body section 10 and can be withdrawn therefrom upon removing the operating lever 43 from the handle.

The temperature of the heating coil 60, is continuously maintained, as described, by connection with the lighting circuit. The flexible tube 28, as shown, is of relatively small bore, to restrict the quantity of water contained in it at any one time, so that if cooled by standing in the tube, the water may be readily brought up to temperature as it flows through the heated tubular member 13 with its compactly arranged heating coil. Therefore, when the syringe has not been in use for a considerable period of time, or when only small quantities of water are intermittently discharged, so that the water tends to cool off in the tube 28, the invention provides means located in the syringe body itself for both maintaining the temperature of the water contained in the syringe body and bringing up to the proper temperature the water flowing through the syringe from the tube 28, pending such increased use as will result in the arrival at the syringe of warm water from the unit 49.

I claim:

1. A syringe comprising a tubular body, a fluid holding tubular member extending longitudinally within the body, nozzle means for the fluid within said member movable longitudinally on the tubular body, a valve within the body for controlling the fluid actuated by said nozzle means when moving it in one direction on the tubular body, and heating means within the body surrounding a portion of the tubular member therein.

2. A syringe comprising a tubular body, a fluid holding tubular member extending longitudinally within the body, outlet means for the fluid within said member movable longitudinally on the tubular body, valve means within said tubular member adapted to be opened by moving the outlet means in one direction on the body, a closed heating chamber within the tubular body between the outlet means and the valve means and substantially encircling the fluid holding tubular member, and an electric heating element within said chamber for heating the fluid in said tubular member.

3. A syringe comprising a tubular body, a fluid holding tubular member extending longitudinally within the body, valve means within said tubular member, a heating chamber within the tubular body in advance of the valve means, an electric heating element within said chamber, a tubular section movable on said body to actuate the valve means, said tubular section communicating with said tubular member, and a nozzle on said tubular section movable therewith when said section is moved to actuate the valve.

4. A syringe comprising a tubular body, a fluid holding tubular member extending longitudinally within the body, a nozzle carrying member movable on the tubular body, a normally closed valve within the tubular member dividing it into inner and outer fluid holding passages, an operating part for the valve extending longitudinally within said outer fluid holding passage and adapted to be actuated by the nozzle carrying member upon moving it on the tubular body, a heating chamber for heating the walls of the tubular member, said chamber encircling a portion of the tubular member surrounding the outer fluid holding passage, and an electric heating element within said chamber.

5. A syringe comprising a tubular body, a fluid holding tubular member extending longitudinally within said body, a normally closed valve within the tubular member dividing it into inner and outer fluid holding portions, an operating part for the valve extending longitudinally within said outer fluid holding portion, a heating chamber within said body for heating the walls of the tubular member surrounding said fluid holding portions and said valve, an electric heating coil within said chamber encircling said valve and said tubular member at a point opposite one of said fluid holding portions, an actuating member movable on said body for moving said valve operating part to open the valve, said actuating member communicating with said tubular member, and a nozzle carried by the actuating member.

6. A syringe comprising inner and outer tubular body sections, a nozzle carried by the outer section, means operable to move the outer section longitudinally of the inner section, said inner section including a fluid holding tubular member extending within the outer section and communicating therewith, a valve within the tubular member between the ends thereof having an operating part actuated by the outer section when moving it in one direction upon the inner section, and an electric heating element within the inner body section for heating the fluid holding portion of the tubular member immediately in advance of the valve.

7. A syringe comprising inner and outer tubular body sections movable one longitudinally of another, a nozzle on the outer section, a valve disposed within the inner section between the ends thereof for dividing said section into oppositely extending inner and outer fluid holding portions, the valve being opened by movement of the outer section longitudinally on the inner section, and an electric heating coil fixed on the inner section in advance of the valve and serving to heat a part of the fluid holding portion of the inner section.

8. A syringe comprising inner and outer tubular body sections movable one longitudinally of another, a nozzle on the outer section, a valve disposed within the inner section between the ends thereof serving when closed to divide said section into oppositely extending fluid holding portions, the valve being opened by movement of one of the sections longitudinally of another in one direction, a heating chamber extending longitudinally of the inner body section and substantially encircling the oppositely extending fluid holding portions thereof, and an electric heating coil within said chamber.

9. A syringe comprising inner and outer tubular body sections mounted for movement one longitudinally of another, a nozzle carried by the outer section, means operable to move one of the sections longitudinally of the other, said inner section including a fluid holding tubular member communicating with the outer section, a valve within the tubular member between the ends thereof serving when closed to divide it into oppositely extending fluid holding portions, the valve having an operating part by which it is moved to open position upon movement of one of the sections longitudinally of the other in one direction, and an electric heater associated with the portion of the tubular member disposed outwardly of the valve for heating the fluid held in said portion by the valve.

10. A syringe comprising inner and outer tubular body sections mounted for movement one longitudinally of the other, a nozzle carried by the outer section, means operable to move one of the sections longitudinally of the other, said inner section including a fluid holding tubular member communicating with the outer section, a valve within the tubular member between the ends thereof serving when closed to divide it into oppositely extending fluid holding portions, the valve having an operating part actuated by one of the body sections upon moving one longitudinally of another, a heating chamber extending longitudinally of the tubular member and substantially surrounding said oppositely extending fluid holding portions to heat the fluid therein, and an electric heating element within said chamber.

11. A syringe comprising inner and outer tubular body sections movable one longitudinally of another, a nozzle carried by the outer section, said inner section including a handle for the syringe and having therein a fluid holding tubular member the outer end of which is telescoped within the outer body section, a valve within said tubular member between the ends thereof serving when closed to divide said member into oppositely extending fluid holding portions, said valve being opened to establish communication between said portions upon movement of one of the sections longitudinally of another, a heating chamber within the handle extending longitudinally thereof and substantially surrounding the oppositely extending fluid holding portions of said tubular member, and an electric heating coil surrounding one of said fluid holding portions for supplying heat to said chamber to heat both of said portions.

12. A syringe comprising inner and outer tubular body sections movable one longitudinally of another, a nozzle carried by the outer section, means operable to move the outer section longitudinally of the inner section, said inner section including a fluid holding tubular member communicating with the outer body section, a valve within the tubular member serving when closed to divide it into oppositely extending fluid holding portions, said valve being opened by movement of one of the body sections longitudinally of the other, a heating chamber extending longitudinally of said tubular member and encircling said oppositely extending fluid holding portions, an electric heating coil surrounding one of said portions for supplying heat to said chamber for heating both of said fluid holding portions, a fluid supply tube connected with said tubular member, and circuit connections within said supply tube for supplying current to said coil.

13. A syringe comprising inner and outer tubular body sections movable one longitudinally of another, said inner section having a valve therein between its ends normally dividing the section into inner and outer fluid holding portions, means forming a closed heating chamber about the inner end of said outer fluid holding portion, an electric heating element within said chamber, said valve being opened by movement of one of the body sections longitudinally of the other in one direction, and means for moving said last mentioned section in said direction.

14. A syringe comprising a tubular handle, an outer tubular body section including a nozzle movable longitudinally on the handle, and a unitary fluid holding tubular section within the handle having associated parts including a valve between the ends of said section for dividing it into inner and outer fluid holding portions and also including means forming a closed heating chamber about said outer fluid holding portion, and an electric heating element within the chamber for heating said outer fluid holding portion, said fluid holding section and associated parts being removable from the handle as a unit and said valve being opened by inward movement of said body section upon the handle.

15. A syringe comprising a tubular handle, an outer tubular body section movable longitudinally on the handle, a nozzle on said section movable therewith, a unitary inner section mounted within the handle and including a fluid holding tube communicating with said tubular body section, said fluid holding tube having a valve intermediate its ends and having a surrounding electric heating coil in advance of the valve, said inner section and the valve and coil being withdrawable from the handle as a unit, and a part for opening the valve extending within the tubular body section and operated by said section when moving it longitudinally on the handle in one direction.

16. A syringe comprising a tubular handle, an outer tubular body section movable longitudinally on the handle, a nozzle carried by said section, a unitary inner fluid holding section within the handle, a valve within the inner tubular section between the ends thereof normally dividing it into inner and outer fluid holding portions, an electric heating coil encircling one of said fluid holding portions for heating the fluid therein, said valve being opened by inward movement of the tubular body section upon the handle, said inner tubular fluid holding section and the valve and heating coil being removable from the handle as a unit, and detachable means on the handle for supporting the inner tubular section therein.

17. A syringe comprising a tubular handle, an outer tubular body section movable longitudinally on the handle, a nozzle carried by said section, a unitary inner fluid holding section within the handle, a valve within the fluid holding section between the ends thereof normally dividing the section into inner and outer fluid holding portions, means within the handle forming a closed heating chamber about the valve and the fluid holding portions at the opposite ends of the valves, an electric heating element within said chamber, said inner fluid holding section together with the chamber forming means and the valve and heating coil being withdrawable from the handle as a unit, and means for moving the tubular body section upon the handle to effect opening of the valve.

18. A syringe comprising inner and outer tubular body sections movable one longitudinally on another, a nozzle on said outer section, a valve within said inner section for controlling the flow of the liquid to the nozzle, an electric heating element within the inner body section for heating the liquid, and means for moving one of the body sections longitudinally on the other to effect opening of the valve.

19. A syringe comprising inner and outer tubular body sections movable one longitudinally on another, a nozzle on said outer section, a valve within said inner section for controlling the flow of the liquid to the nozzle, an electric heating element within the inner body section disposed outwardly of the valve for heating the liquid remaining within the syringe in advance of the valve upon closing the latter, and means for moving one of the body sections longitudinally on the other to effect opening of the valve.

20. A syringe comprising inner and outer tubular body sections movable one longitudinally on another, said outer section having a nozzle thereon, a valve within the inner section for controlling the flow of the liquid to the nozzle, means forming a heating chamber extending inwardly and outwardly of the valve, an electric heating element within the chamber for heating the liquid on opposite sides of the valve, and means for moving one of the body sections longitudinally of the other to effect opening of the valve.

21. A syringe comprising a body, a nozzle carrying member movable on said body, a tubular fluid holding member within said body, said fluid holding member having a portion spaced from said body to provide a heating chamber between said fluid holding member and said body, a fluid control valve associated with said fluid holding member and adapted to be opened by movement of said nozzle carrying member upon said body, and an electric heating element in said heating chamber, said fluid holding member including a substantial body of metal to receive and retain heat from said heating element and to conduct heat to the fluid within said fluid holding member.

22. A syringe comprising a casing, a tubular fluid holding member within said casing, at least a part of said fluid holding member being of smaller external size than the internal size of said casing to provide an annular heating chamber between said member and said casing, an electric heating coil in said chamber surrounding said portion of said fluid holding member, the portion of said fluid holding member adjacent said electric heating coil including a body of metal of substantial thickness, a nozzle carrying member movable upon said casing and in communication with a portion of said fluid holding member, and valve means for closing said fluid holding member adapted to be opened by movement of said nozzle carrying member in one direction.

23. A syringe comprising a tubular body, a liquid holding tubular member extending longitudinally within the body and normally filled with liquid, outlet means for the liquid movable on said tubular body, a valve within the tubular body between the ends of the tubular member for controlling the liquid, said valve being operated by movement of said outlet means in one direction, and heating means within the body substantially surrounding the tubular member and adapted to heat the liquid therein.

24. A syringe comprising a tubular body, a liquid holding tubular member extending longitudinally within the body and normally filled with liquid, outlet means for the liquid movable on said tubular body, a valve within the tubular body between the ends of the tubular member adapted to control the liquid and to be opened by movement of the outlet means in one direction on the tubular body, a heating chamber substantially surrounding the tubular member and extending forwardly and rearwardly of the valve, and electric heating means within said chamber.

25. A syringe comprising a tubular body, a liquid holding tubular member extending longitudinally within the body, a valve within said tubular member for controlling the fluid, a nozzle movable on the tubular body to effect opening of the valve, means for moving the nozzle, means substantially surrounding the tubular member within said tubular body and forming a heating chamber for heating the liquid within the tubular member, said chamber extending longitudinally on opposite sides of the valve, and heating means within said chamber.

26. A syringe comprising a tubular body, an outer tubular body section including a nozzle movable longitudinally on said tubular body, a fluid holding tubular member extending longitudinally within said body and having an extension projecting within said outer body section, a valve for controlling the passage of the fluid through the tubular member having an operating part adapted to be actuated by the outer body section to open the valve upon moving said body section in one direction on the tubular body, and electric heating means within the tubular body substantially surrounding the fluid holding member therein and adapted for heating the liquid between the valve and the outer body section.

27. A syringe comprising inner and outer tubular body sections, said outer section being movable longitudinally on the inner section, a nozzle on the outer section, a valve normally closing one of said tubular sections and having an operating part extending within the outer section for operation by said section upon moving it longitudinally on the inner section in one direction, an electric heating element within one of the body sections for heating the liquid, operating means movable on the inner body section for moving the outer section thereon, and means for returning the outer section to normal position upon release of said operating means.

28. In a warm water syringe, a body portion having a nozzle and a passage through said portion, a valve controlling the flow of water through said passage, a source of warm water, a flexible tube of relatively small bore connecting said passage with said source, a heating element located in said body portion in proximity to said passage but without contact with the water therein for heating the water contained in said passage and also for heating the water contained in said tube as it flows through said passage to the nozzle pending the arrival of warm water from said source, and means for continuously maintaining the temperature of said heating element.

ALPHONSE F. PIEPER.